May 21, 1968     W. W. EGEE ETAL     3,384,268
MIXING AND DISPENSING UNIT
Filed July 22, 1966     8 Sheets-Sheet 1

FIG. 1.

INVENTORS:
WALTER WARREN EGEE
WOLF A. VONLERSNER
WILLIAM J. FEEHERY, JR.
BY Howson & Howson
ATTYS.

INVENTORS:
WALTER WARREN EGEE
WOLF A. VONLERSNER
WILLIAM J. FEEHERY, JR.
BY Howson & Howson
ATTYS.

INVENTORS:
WALTER WARREN EGEE
WOLF A. VONLERSNER
WILLIAM J. FEEHERY, JR.
BY Howson & Howson
ATTYS.

Fig. 16.

INVENTORS:
WALTER WARREN EGEE
WOLF A. VONLERSNER
WILLIAM J. FEEHERY, JR.

FIG. 17.

United States Patent Office 3,384,268
Patented May 21, 1968

1

3,384,268
MIXING AND DISPENSING UNIT
Walter Warren Egee, Wallingford, Pa., Wolf A. von
Lersner, Cherry Hill, N.J., and William J. Feehery,
Jr., Collingdale, Pa., assignors to Campbell Soup
Company, Camden, N.J., a corporation of New
Jersey
Filed July 22, 1966, Ser. No. 567,255
15 Claims. (Cl. 222—1)

ABSTRACT OF THE DISCLOSURE

A coin-operated mixing and dispensing unit to combine and mix metered quantities of two liquid ingredients and dispense the mixed ingredients into a container. The mixing and dispensing unit include a rotor positioned within a cylindrical casing. A radial bore extends into the rotor from its periphery and a piston is mounted for reciprocating movement within the bore. The rotor is adapted to be rotated within the casing to position the bore successively at three different positions relative to the casing. When the bore is at the first position, the piston is caused to partially retract within the bore to draw a measured quantity of the first ingredient into the bore. When the rotor is positioned at the second position within the casing, the piston is caused to further retract within the bore to draw a measured quantity of the second ingredient into the bore and cause the second ingredient to be mixed with the first ingredient. The third position of the rotor within the casing is the discharge position and when the rotor is in this position, the piston is advanced relative to the bore to discharge the two ingredients from the bore. Simultaneously with the advancement of the piston within the bore at the discharge position, an additional measured quantity of the second ingredient is added to the mixture to further mix the two ingredients and to aid in flushing the two ingredients out of the bore.

---

The present invention relates to a mixing and dispensing unit operable to combine metered quantities of at least two ingredients, mix the same, and dispense them into a receiver. More specifically, the present invention relates to a coin-operated vending machine operable to dispense individual portions of food product. The invention has particular application to the mixing and dispensing of soup wherein the soup is stored in a highly concentrated form in a refrigerated reservoir and is mixed with heated water in sufficient quantity to produce the desired temperature and consistency in the mixture dispensed.

Prior to the present invention, there has been no satisfactory vending machine for dispensing a wide variety of soups because of the difficulty in maintaining the desired quality in the soup mixture over prolonged periods of time. Furthermore, many soups contain a high degree of solids content which tent to settle to the bottom of the reservoir and the soup dispensed from the reservoir is not uniformly possessed of the desired solids content. To overcome these drawbacks, soup has been dispensed by depositing a desired quantity of dried soup mix into a container of heated water, but this has not been entirely satisfactory because of the limitations in the varieties of soup available in the dried soup mix and because of the desirability of simmering a mixture of dried soup and water for a sufficient time period to produce satisfactory quality.

With the foregoing in mind, the present invention provides a mixing and dispensing unit which stores the food product under refrigeration in a highly concentrated fluid form and mixes the concentrate with the necessary amount of heated diluent to provide a product of the proper consistency and of the proper temperature for consumption.

The present invention also provides apparatus capable of dispensing a metered quantity of the fluid concentrate whose viscosity is such as to maintain the solids content thereof in suspension and disposed uniformly throughout the mass. The metered quantity of the concentrate is mixed with a metered quantity of diluent, such as hot water, and is dispensed at the proper consistency for consumption.

More particularly, the present invention provides apparatus including a mixing chamber having a metering piston therein operable to withdraw from the concentrate reservoir a predetermined charge of viscous fluid concentrate at a first charging station, and additional charges of diluents at subsequent stations, the first charge of the diluent being injected into the cylinder to effect thorough premixing of the ingredients within the cylinder prior to discharge of the mixture from the cylinder at the discharging station, the final charge of diluent serving to flush the cylinder at the discharging station.

The present invention also provides apparatus wherein the heated diluent is continuously recirculated through the apparatus and is controlled in its circulation to maintain the temperature thereof consistently at the proper degree to provide a mixture heated to the proper temperature for consumption.

A further object of the present invention is to provide a unit wherein the components thereof are readily disassembled for periodic cleaning and inspection.

All of the objects of the invention are more fully set forth hereinafter with reference to the accompanying drawings wherein.

The mixing and dispensing unit of the present invention comprises a refrigerated compartment having a reservoir therein for storing a supply of at least one ingredient of the mixture to be dispensed, in the present instance a fluid concentrate such as soup, and a mixing device operable to receive a charge of said ingredient at a first charging station, and prior to discharge receive successive charges of another ingredient, in the present instance, a diluent such as hot water, supplied in heated condition to the mixing unit from a separate supply located exteriorly of the refrigerated compartment. The device discharges the mixture at a discharging station into a receptacle dispensed from a receptacle-dispensing mechanism which stores a supply of disposable receptacles and is operable to position a receptacle and to receive the mixture discharged from the mixing device. Suitable controls, in the present instance including a coin-operated mechanism, are provided in the unit to initiate operation of the mixing and dispensing device so as to mix the successive charges of the ingredients and dispense the mixture into individual receptacles for ultimate consumption.

With reference to the embodiment of the invention illustrated in FIGS. 1 to 17 inclusive, the illustrated unit 21 comprises a refrigerated compartment 22 having a conventional refrigerator unit 23 therein which, in the present instance, operates to maintain the compartment 22 at the proper temperature (such as 40° F.) for the storage of the prime ingredient of the mixture to be dispensed, in the present instance soup concentrate. The concentrate is stored therein in a reservoir 24 having a discharge spout connected to an inlet port 25 of mixing and dispensing device 26 in the compartment 22. The reservoir 24 may be a simple container, as shown, or may comprise a disposable collapsible cartridge containing the prime ingredient. The mixing device 26 includes a rotor 27 having a bore 28 therein (see FIGS. 4, 7, and 12–14) to provide a mixing chamber. The rotor 27 is rotatable within the cylindrical wall 29 of the casing 30 to position the bore 28 at successive positions indicated at A, B and C in FIG. 1. When in position A, the bore 28 is in registry with a discharge port 32, and when in position B, the bore is in registry with the inlet port 25 at a first charging station. Means is provided to introduce a charge of hot water into the bore 28 at a second charging station intermediate the positions B and A, for example at the position C; and to this end, conduit means 34 is connected to the rotor 27 leading from a hot water supply means 35 located exteriorly of the compartment 22. A cup dispenser 38 and feeder 39 supply empty receptacles and position them in registry with the discharge port 32 at a discharging station at position A. A start button is provided at 41 to initiate operation of the unit when it is activated by a conventional coin-controlled device 42.

Figure 1:
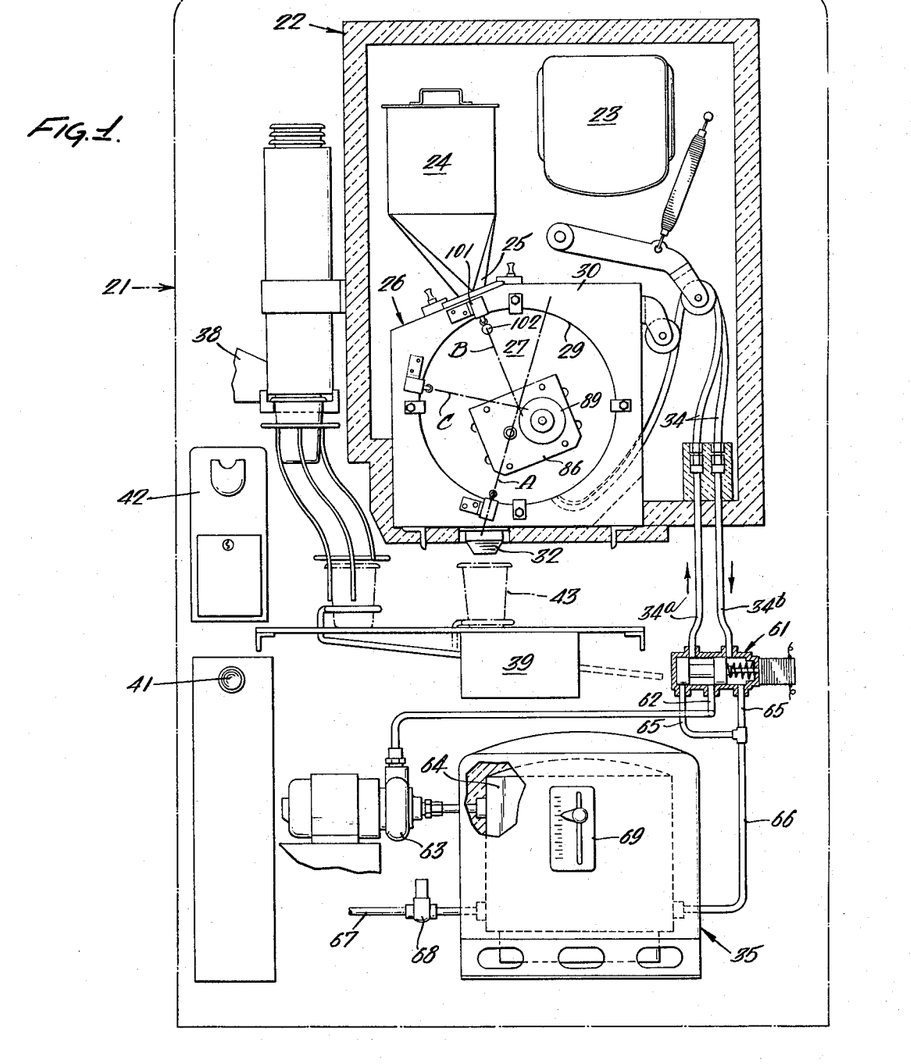
FIG. 1 is a diagrammatic representation of a mixing and dispensing unit made in accordance with the present invention showing the mixing device, the cup dispenser, and, diagrammatically, the controls therefor.
Figure 2:
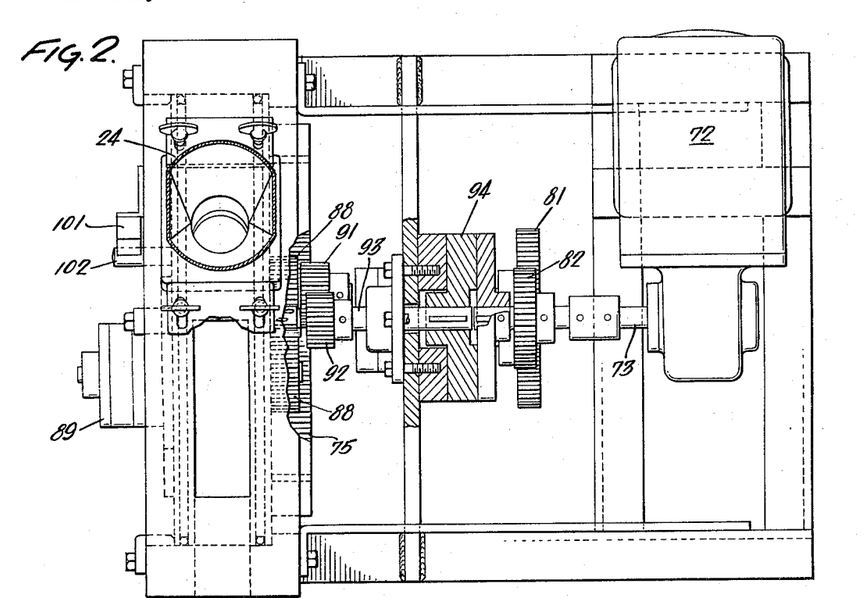
FIG. 2 is a fragmentary plan view of the mixing device, with portions broken away showing the driving connections thereto.
Figure 3:
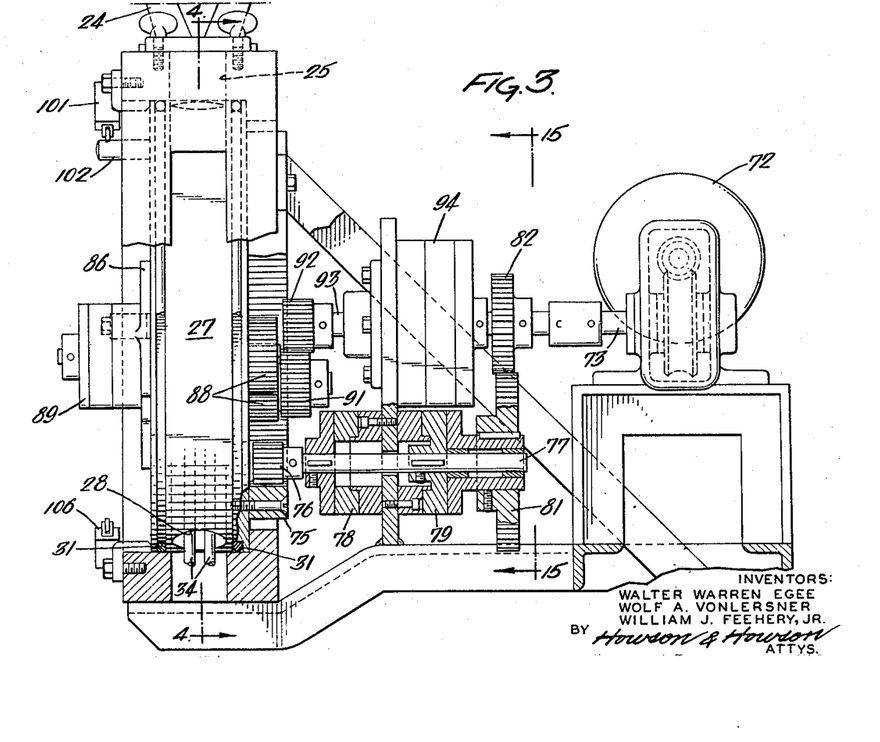
FIG. 3 is a fragmentary view in side elevation with portions broken away of the device shown in FIG. 2.

The rest position of the mixing device is when the rotor 27 positions the bore 28 at position A. Initiation of the operation indexes the rotor clockwise to the position B where a charge of soup concentrate from the reservoir 24 is introduced into the bore. The rotor 27 then indexes counterclockwise to an intermediate position, for example position C and a second charge is introduced into the bore, in the present instance hot water. The charge at position S is introduced under high pressure so as to thoroughly intermix the second charge with the first charge in the bore, thereby providing both a premix and a preheating prior to discharge. After introduction of the second charge, the rotor is again indexed counterclockwise to position the bore 28 in registry with the discharge port 32. When the bore is in registry with the discharge port 32, the mixture of the first two charges is discharged from the bore and a third charge is introduced to be discharged therewith, in the present instance the third charge being additional hot water. The third charge serves to flush the mixture from the bore 28 and the discharge port 32, and to dilute the mixture to the proper consistency and raise the temperature to the proper level, the mixture passing into the cup 43 positioned below the discharge spout 32 by the cup dispenser 38 and feeder 39.

Figure 4:
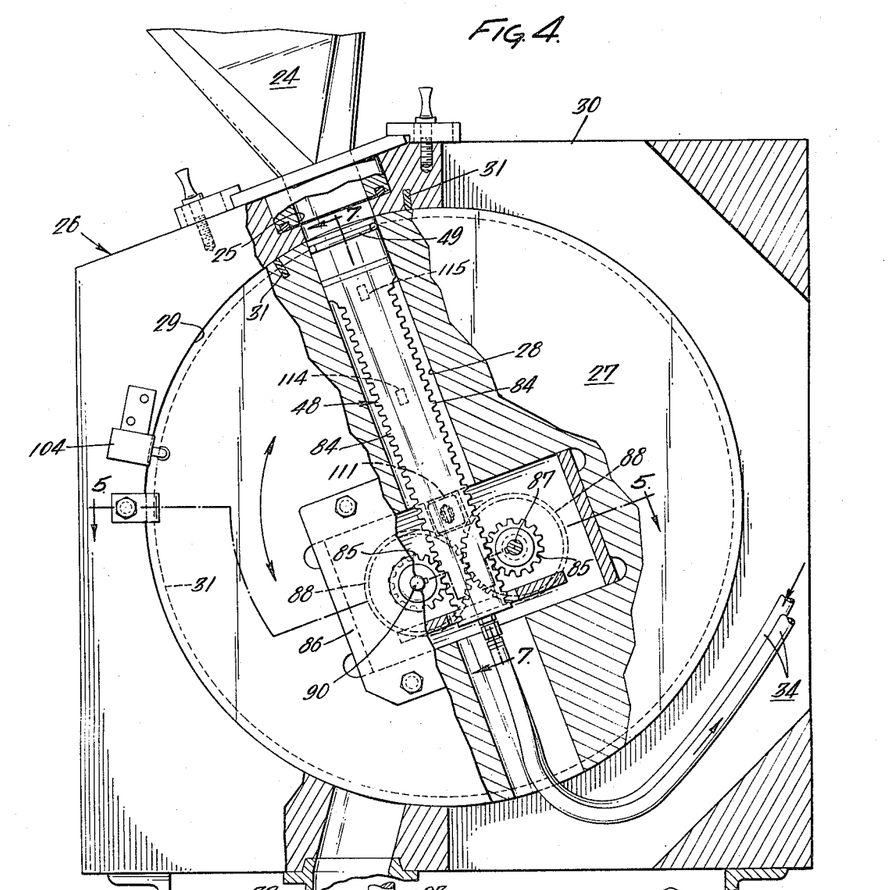
FIG. 4 is an enlarged sectional view taken on the line 4—4 of FIG. 3.
Figure 12:
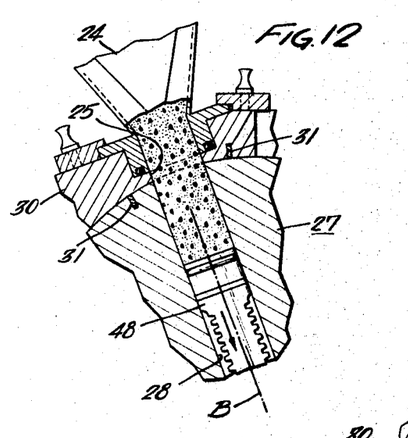
FIGS. 12, 13, and 14 are fragmentary sectional views showing a sequence in the operation of the mixing unit.
Figure 13:
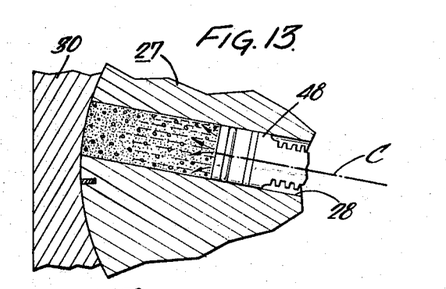
Figure 14:
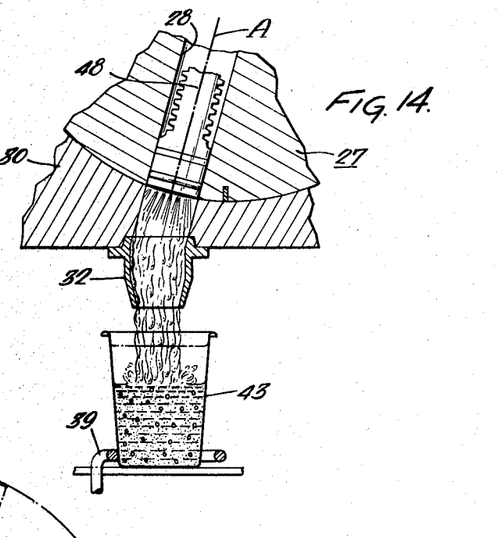

In accordance with the invention, means is provided to meter successive charges of the ingredients of the mixture into the bore 28 during the operation of the mixing and dispensing unit 27. To this end, a piston 48 is slidably mounted for retraction and advance within the bore in timed relation to movements of the rotor 27, to provide a mixing chamber in the bore between the piston 48 and the wall 29 of the casing 30. When the bore is indexed to the position B, the open outer end of the bore 28 is in registry with the inlet port 25 from the reservoir 24, and the piston 48 is fully advanced as shown in FIG. 4. The subsequent movement of the piston 48 (retractive) draws the first charge, in the present instance the soup concentrate, into the bore 28 as shown in FIG. 12. After the charge is received in the bore 28, the rotor 27 is indexed to the position C, as shown in FIG. 13 and the subsequent charge of ingredients is injected under pressure into the bore 28, in this instance, a charge of hot water approximately equal in volume to the charge of the soup concentrate received at position B. The pressure of the second charge injected into the mixing chamber in the bore effects a turbulent intermixture of the first two charges, preheating and premixing the same. After the second charge is received at position C, the rotor 27 is indexed to the position A, as shown at FIG. 14, and the piston 48 is advanced from its full retracted position to the fully advanced position to discharge the mixture contained in the chamber and a third charge of the ingredients, in the present instance a second charge of hot water, is injected to flush the mixture from the bore 28 and the discharge opening 32 into the cup 43 positioned below the discharge opening. In the present instance, the third charge is approximately equal in volume to the cumulated volume of the first and second charges so as to dilute the soup concentrate received in the bore at the position B to a consistency approximately four times as dilute as the concentrate. The hot water injected at positions C and A is maintained at a temperature approximately 200° F., which, when combined with the concentrate which is maintained at approximately 45° F., provides a temperature in the final mixture of the proper degree for consumption.

Figure 7:
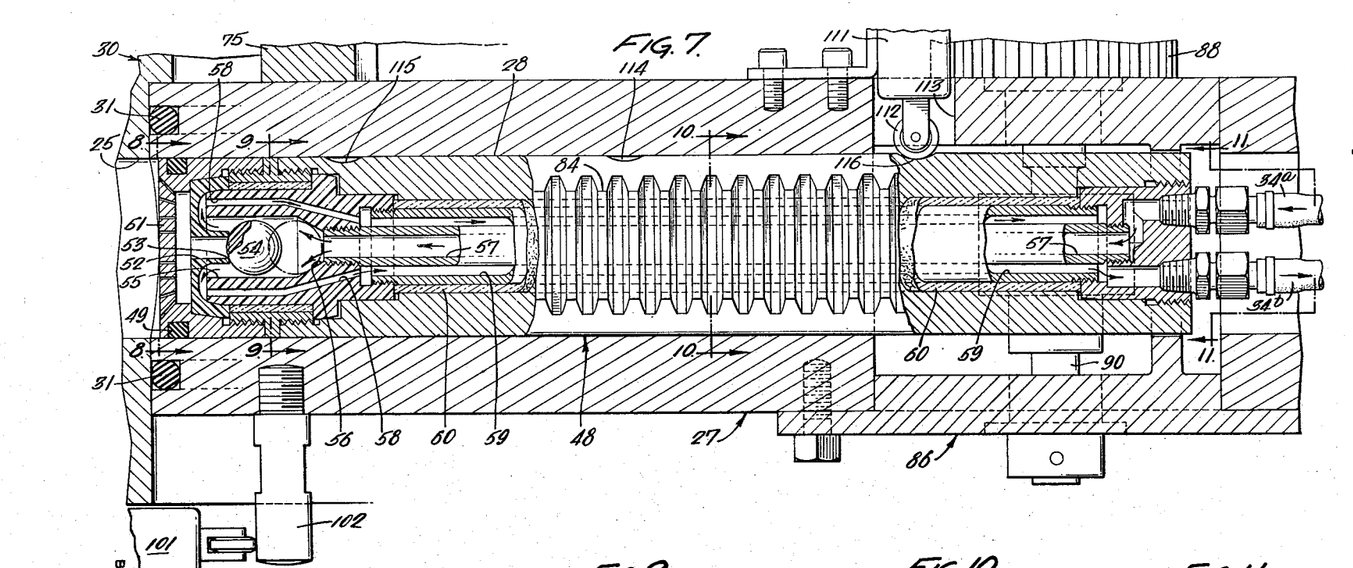
FIG. 7 is an enlarged sectional view taken on the line 7—7 of FIG. 4.
Figure 8:
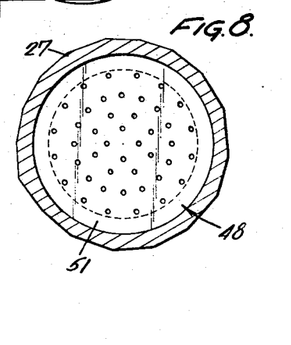
FIGS. 8, 9, 10 and 11 are transverse sectional views taken on the respective lines 8—8, 9—9, 10—10, and 11—11 of FIG. 7.
Figure 9:
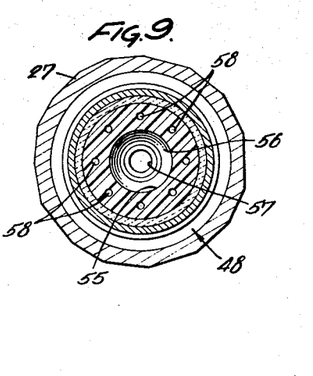
Figure 10:
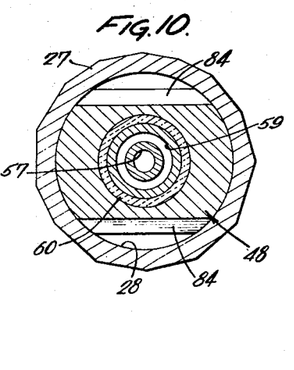
Figure 11:
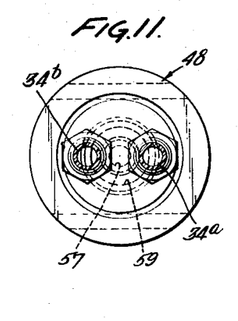

In this embodiment of the invention, the hot water is injected into the bore through the piston head. To this end, the piston 48, as shown in FIG. 7, includes a nozzle plate 51 at its forward end having a series of passages therethrough operable to direct the water injected therethrough at high pressure across the full cross sectional area of the bore. Behind the nozzle plate 51, the piston provides a valve throat 52 terminating at its inner end in a seat 53 adapted to engage a spherical valve element 54. The valve element 54 is axially displaceable within a valve chamber 55 having a conical valve seat 56 at the end opposite the seat 53. The valve seat 56 terminates in a passageway 57 extending axially through the bore and connected at the opposite end to one line 34a of the conduit means 34 set forth above. At the opposite end, the annular portion of the chamber 55 surrounding the throat 52 and valve seat 53, communicates through ports 58 and an annular coaxial passageway 59 surrounding the central passageway 57 with a second line 34b of the conduit means 34. During operation of the unit, hot water under pressure is supplied continuously to the lines 34a and 34b.

In rest condition, the pressurized water is supplied to the line 34a and flows through the central passageway 57 into the chamber 55 and outwardly through the ports 58 and annular passageway 59 into the line 34b, as indicated by the arrows in FIG. 7. When it is desired to inject hot water into the bore 28, for example at the positions C and A, the flow through the lines 34a and 34b is reversed so as to cause the water to flow forwardly in the passageway 59 into the chamber 55 and rearwardly through the valve seat 56 into the central passageway 57 and outwardly through the line 34a. This flow displaces the valve element 54 rearwardly to the broken line position shown in FIG. 7, causing the valve element 54 to engage upon the conical seat 56 and interrupt flow through the passageway 57. Interruption of the flow through the passageway 57 effects flow through the seat 53 and the throat 52 to cause flow into the bore 28 through the openings of the nozzle 51. The pressure of the water flowing through the nozzle 51 effects sufficient turbulence in the flow to provide a thorough inter-mixture of the water with the concentrate within the mixing chamber so as to thoroughly intermix the water with the concentrate and preheat the same. During the reverse flow at position C, when the water is ejected through the nozzle plate 51, the piston 48 is retracted a predetermined distance so as to provide a metered space within the bore 28 to receive the water injected through the nozzle plate of the piston, as described more fully hereinafter.

To effect reversal of the flow of water through the lines 34a and 34b, a pressure-relief reversing valve 61 is connected to the conduit means 34. The pressure inlet 62 of the valve 61 is connected to the exhaust of a pump 63 whose inlet is connected to a hot water reservoir 64 in the hot water supply 35. The exhaust outlets 65 of the valve 61 are connected to the reservoir 64 through a line 66. Makeup water is supplied to the reservoir 64 through a suitable inlet 67 controlled by a valve 68. A conventional thermostat is provided at 69 to maintain the temperature of the water in the reservoir at the desired degree, for example 200° F. The safety-relief reversing valve 61 operates to normally introduce hot water under pressure through the line 34a and to discharge the hot water through the line 34b. When it is desired to inject hot water into the bore 28, the valve 61 is actuated to effect flow of the pressurized water into the line 34b and from the line 34a. When the mixing chamber is filled and sufficient water has been discharged, flow through the valve 61 is reversed, as described hereinafter and the flow returns to the rest condition shown in FIG. 1. In this way, hot water is flowing continuously through the lines 34a and 34b and through the piston passages 57 and 58 when the unit is in rest condition, thereby controlling the temperature of the hot water ready for instantaneous demand upon initiation of the operation of the unit. This in turn, insures the proper temperature in the final mixture dispensed from the apparatus. It is noted that the passages 57 and 59 are insulated from the rotor by an insulating sleeve 60 to limit the heat transfer between the hot water in the passages and the refrigerated compartment, and the fitting which houses the chamber 55 and ports 58 is of a plastic material having a low heat-transfer coefficient. Furthermore, the seals provided at 31 and 49 prevent leakage from the bore and insure that the apparatus is wiped clean in its normal operation. The construction of the apparatus lends itself to easy disassembly for cleaning by simply disconnecting the reservoir 24 from the rotor housing 26 and the lines 34a and 34b from the piston 48; removing the rotor 27 from the housing 26; displacing the piston 48 from the bore 28 in the rotor; and dismantling the piston assembly.

Figure 15:
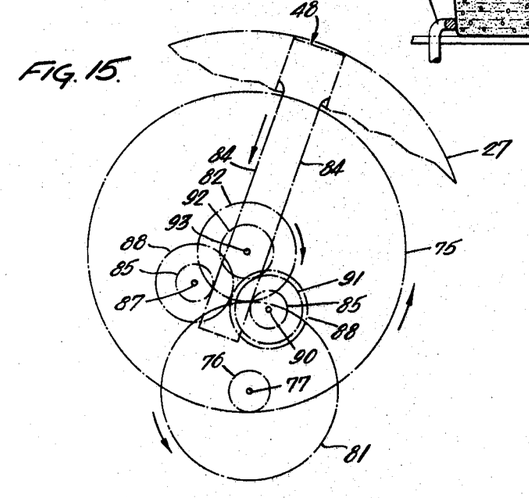
FIG. 15 is a diagram of the driving connections shown in FIGS 2, 3, 4, and 5, as seen from the line 15—15 of FIG. 2.

As pointed out above, the piston is retracted and advanced in timed relation to the indexing of the rotor. The drive for the rotor and piston respectively is shown in FIGS. 2–6 and 15. These elements are driven from a reversible motor 72 which is energized when the start button 41 of the unit is pressed. Prime rotation of the motor 72 drives the shaft 73 clockwise as shown in FIG. 15. Counterrotation of the motor 72 drives this shaft counterclockwise. Clockwise rotation of the shaft 73 drives the rotor 27 counterclockwise as shown in FIG. 15 or clockwise as shown in FIG. 1 and is effective to advance the piston 48, both as described more fully hereinafter.

The rotor 27 is driven by a ring gear 75 mounted on its inward surface and having internal teeth as shown in the drawing. The gear 75 is engaged by a pinion 76 mounted on a shaft 77 having a rotor brake 78 and a clutch 79. The brake 78 is adapted to be energized when the clutch 79 is deenergized and vice versa. When the clutch 79 is deenergized, the brake 78 retains the pinion 76 immobile, thereby immobilizing the rotor 27. When the clutch 79 is energized, the shaft 77 is rotated by a drive gear 81 coupled thereto through the clutch 79 and driven by a gear 82 on the shaft 73. When the clutch is energized, therefore, as shown in FIG. 15, clockwise rotation of the shaft 73 drives the gear 82 clockwise and the gear 81 counterclockwise, thereby rotating the shaft 77 and pinion 76 counterclockwise driving the ring gear 75 and the rotor 27 counterclockwise as shown in FIG. 15 or clockwise as shown in FIG. 1. Counterrotation of the shaft 73, on the other hand, drives the rotor clockwise as shown in FIG. 15 or counterclockwise as shown in FIG. 1.

Figure 5:
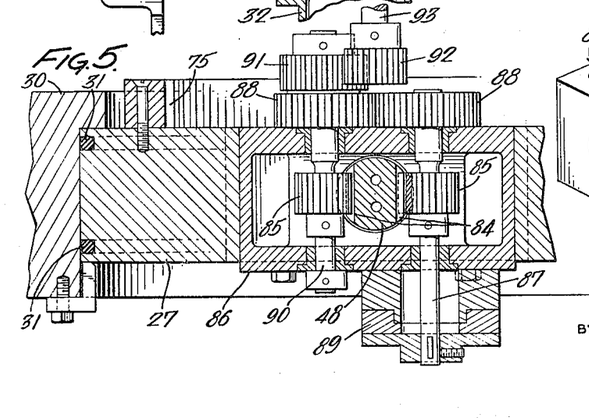
FIG. 5 is a fragmentary sectional view taken on the irregular line 5—5 of FIG. 4, with portions broken away to illustrate the internal structure of the device including a piston and the pinion drive therefor.
Figure 6:
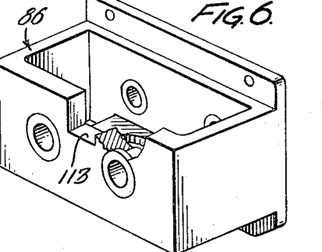
FIG. 6 is a detached perspective view of the pinion housing shown in FIG. 5.

The piston 48 is driven by racks 84, 84 formed on the piston and pinions 85, 85 mounted in a gear box 86 in the rotor 27. As shown in FIG. 5, the pinions 85, 85 are driven by pinion gears 88, 88 and are adapted to be immobilized by a brake 89 on the shaft 87 of one of the pinions 85. The shaft 90 of the other of the pinions 85 is driven by gears 91 and 92 from a shaft 93 coaxial with and coupled to the shaft 73 through a clutch 94. When the clutch 94 is energized, the brake 89 is deenergized and vice versa, so that when the clutch 94 is deenergized, the brake 89 immobilizes the piston in the rotor 27 and when the clutch 94 is energized, the brake 89 is deenergized, permitting clockwise rotation of the shaft 73, as shown in FIG. 15, to effect advance of the piston 48 and counterclockwise rotation of the shaft 73 to effect retraction of the piston 48.

In the operation of the mixing and dispensing device, the rotor in its rest position, positions the bore 28 at the position A. When the start button is operated, the motor 72 drives the rotor clockwise, as seen in FIG. 1, past the position C to the position B. A limit switch is provided at 101 to be tripped by an operator 102 on the rotor to thereby arrest the rotor when the bore is at position B. The clutch 79 is then deenergized and the brake 78 is energized to immobilize the rotor at this position. Thereupon, the motor 72 is reversed for counterrotation, the clutch 94 is energized, and the brake 89 is deenergized to retract the piston and admit the first charge of the ingredients into the bore. A limit switch 111 is mounted in an opening 113 of the gear box 86 in the rotor and has an operator 112 engageable in a detent 114 to arrest operation of the piston when it is retracted sufficiently to receive a predetermined volume of the ingredient introduced through the inlet port 25. At this point, the clutch 94 is deenergized and the brake 89 is energized to immobilize the piston in this intermediate position.

The rotor is then indexed counterclockwise as shown in FIG. 1 to the position C, the indexing movement being arrested by a limit switch 104 engaged by the operator 102. This is accomplished by energizing the clutch 79 and deenergizing the brake 78 for the indexing movement. At the completion of the movement, the clutch 79 is deenergized and the brake 78 is energized to immobilize the rotor. The piston is then retracted to afford entry of a second charge into the bore, for example by energizing the clutch 94 and deenergizing the brake 89, the retraction continuing until the operator 112 engages in the detent 115. The retraction of the piston is accomplished by energizing the clutch 94 and deenergizing the brake 89. Simultaneously with the further retraction of the piston 48. the flow through the lines 34a and 34b is reversed to introduce hot water into the bore through the nozzle plate 51, as described above. As shown, retraction of the piston affords entry of a volume of hot water approximately equal to the volume of the concentrate admitted at position B, and the pressure of the hot water is such as to cause a turbulent intermixture of the hot water and the concentrate within the bore. When the piston 48 is fully retracted, the clutch 94 is deenergized and the brake 89 is energized to immobilize the piston.

Figure 16:
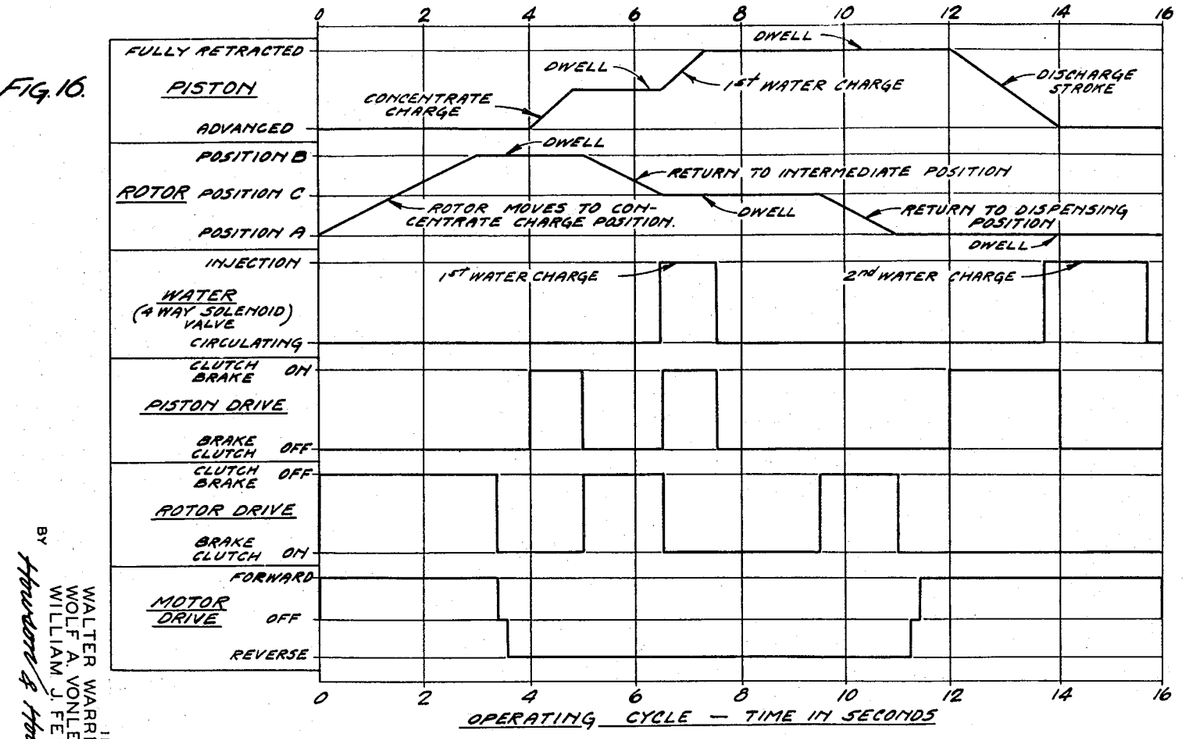
FIG. 16 is a graphic representation showing an operating cycle of the mixing device.

Thereupon the rotor clutch 79 is energized and the brake 78 is deenergized to advance the rotor counterclockwise as shown in FIG. 1 to the rest position at A, arrest of the rotor being accomplished by the limit switch 106 when it is tripped by the operator 102. When the rotor arrives at position A, the clutch 79 is deenergized and the rotor brake 78 is energized to immobilize the rotor and the piston is then advanced. Advance of the piston is accomplished by returning the motor 72 to prime rotation, energizing the clutch 94, and deenergizing the brake 89 to advance the piston to thereby discharge the mixed first and second charges through the discharge port 32. Simultaneously with or immediately following the advance of the piston 48, the flow through the lines 34a and 34b is reversed to effect discharge of hot water through the nozzle plate 51, thereby flushing the bore 28 and the port 32 with fresh water and adding an additional charge of hot water to the mixture flowing through the discharge orifice 32. When the piston is fully advanced to the rest position, the switch operator 112 engages in the detent 116 and arrests the advance of the piston by disengaging the clutch 94 and engaging the brake 89. When the proper quantity of water has been added to the mixture, the flow through the lines 34a and 34b is returned to normal, arresting discharge of the hot water through the piston head and returning the equipment to the rest position. These functions are diagrammed in the time cycle shown in FIG. 16.

Figure 17:
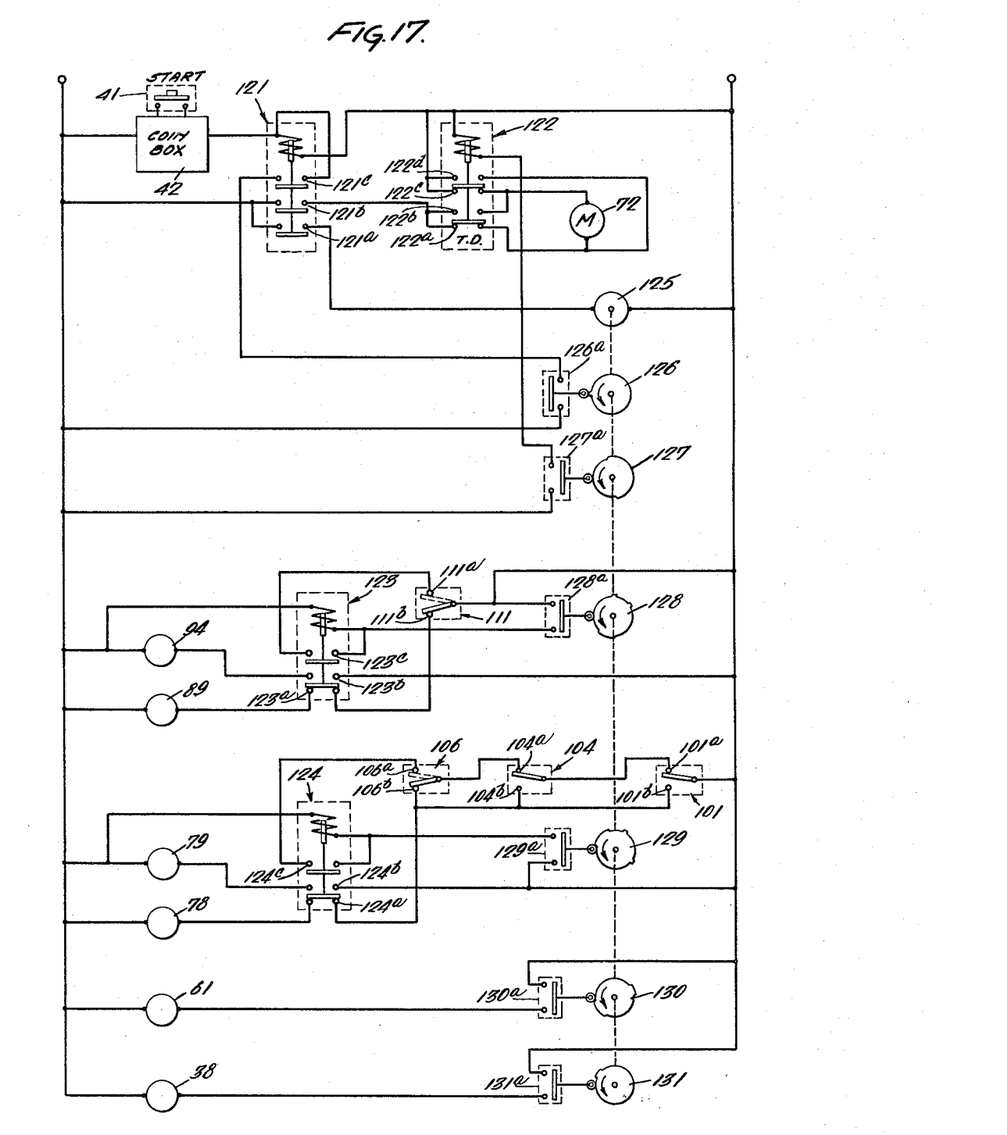
FIG. 17 is a schematic circuit diagram showing a circuit and controls for operating the mixing and dispensing unit as shown in FIGS. 1 to 16.

A suitable control circuit for effecting the above-described operation is shown in FIG. 17. The circuit includes a starting relay 121, a reversing relay 122 for the motor 72, a piston relay 123, a rotor relay 124, and a timer mechanism including a timer motor 125 having timer cams 126, 127, 128, 129, 130, and 131, each cam controlling contacts designated by the same reference number followed by the letter a. In the operation of the circuit, when the coin is inserted in the coin-controlled mechanism 42, the control circuit is activated and is in condition for operation by closure of the start button 41. In the rest position, as shown, all of the timer contacts 126a through 131a are open; the limit switches 101 and 104 have their contacts 101a and 104a closed, and their contacts 101b and 104b open; and the limit switches 106 and 111 have their contacts 106a and 111a open and contacts 106b and 111b closed due to the position of the rotor and piston respectively. When the start button is pressed, the relay 121 is energized, closing the contacts 121a, 121b, and 121c. The contacts 121a close a circuit to the timer motor 125 to start advance of the motor. The contacts 121b close a circuit to the drive motor 72 through the normally closed contacts 122a and 122c respectively of the relay 122, causing the motor to rotate in its prime direction. Closure of the contacts 121c completes a holding circuit to the coil of the relay 121 through the time contacts 126a which are closed by the initial rotation of the timer motor 125 and the cam 126. Rotation of the motor 72 is ineffective since the clutches 79 and 94 are deenergized, and the brakes 78 and 89 are energized through the normally closed relay contacts 124a and 123a respectively and the closed contacts 106b and 111b in the rest positions noted above.

Further rotation of the timer motor 125 causes the cam 129 to close the contacts 129a, energizing the rotary relay 124. Energization of the relay 124 opens the contacts 124a deenergizing the brake 78, closes the contacts 124b energizing the clutch 79, and closes the contacts 124c completing a holding circuit including the contacts 106a, 104a and 101a of the limit switches 106, 104, and 101. The timer cam 129 is effective to retain the relay 124 energized independently of this holding circuit for a sufficient time interval to permit the motor 72 to rotate the rotor 27 clockwise (as in FIG. 1) a sufficient distance to cause the switch operator 102 to pass beyond the switches 106 and 104. When the operator 102 has passed the switch 104 in its clockwise travel, the timer cam 129 opens the contacts 129a and the relay 124 is maintained energized by the holding circuit including the contacts 124c and the contacts 106a, 104a, and 101a. When the operator 102 engages the switch 101, the contact 101a is broken and the contacts 101b is made, thereby breaking the holding circuit and allowing the relay 124 to deenergize. Deenergization of the relay 124 opens the contacts 124b disengaging the clutch 79, and closes the contacts 124a engaging the brake 78 through contact 101b to thereby immobilize the rotor at the position B.

During advance of the rotor from position A to position B, the timer cam 131 closes the contacts 131a to energize the cup dispenser 38. Dispensing of a cup 43 actuates the feeder 39 to position the cup in registry with the discharge spout 32. Failure of the cup feed triggers a stop motion (not shown) to arrest operation of the unit at this point in the operating cycle.

After the rotor 27 is at position B, the timer cam 127 closes the contacts 127a, energizing the relay 122a. Energization of the relay 122a, which is a time-delay relay, immediately opens the contacts 122a, and 122c, and after a short time delay closes the contacts 122b and 122d, thereby reversing the motor 72. After the motor is reversed, the timer cam 128 closes the contacts 128a to energize the relay 123. Energization of the relay 123 opens the contacts 123a interrupting the circuit to the brake 89, closes the contacts 123b energizing the clutch 94, and closes the holding contacts 123c. Energization of the clutch 94 initiates retraction of the piston, thereby operating the switch 111 to the broken-line position of FIG. 17 which closes the contact 111a and opens the contact 111b. Closing the contact 111a completes the holding circuit through the contacts 123c to maintain the relay 123 energized independently of the timer contacts 128a until the switch 111 is actuated by displacement of the piston to a point where the detent 114 is in registry with the switch operator 112. At this point, the contacts 111a are opened, and the contacts 111b are closed to first deenergize the relay 123 and then complete the circuit to the brake 89 through the contacts 123a which are then closed, the clutch 94 being energized by the opening of the contacts 123b.

After completion of the retraction of the piston, the timer cam 129 again closes the contacts 129a, energizing the relay 124. Energization of the relay 124 initiates counterclockwise rotation of the rotor 27 and movement of the rotor closes the contact 101a and opens the contact 101b, thereby completing the holding circuit for the relay 124 through the contacts 124c. Rotation of the rotor 127 continues until the operator 102 engages the switch 104, opening the contact 104a and closing the contact 104b, thereby deenergizing the relay 124 and thereupon deenergizing the clutch 79 and energizing the brake 78. The rotor is then at position C.

At this point in the cycle, the timer cam 130 closes the contacts 130a, energizing the valve 61 to reverse the flow of hot water through the lines 34a and 34b and cause injection of hot water into the bore. Simultaneously, with the injection of hot water into the bore, the piston 48 is retracted by reason of the timer cam 128 closing the contacts 128a and energizing the relay 123. The retraction of the piston 48 initially closes the contact 111a of the switch 111 to hold the relay 123 energized until the operator 112 engages in the detent 115, thereby opening the contact 111a and closing the contact 111b of the switch 111. Opening of the contact 111a deenergizes the relay 123 to arrest the piston movement at its fully retracted position. The timer cam 130 maintains the valve 61 energized for a period sufficient to inject the proper charge of hot water into the bore and then deenergizes the valve to return the hot water flow through the lines 34a and 34b to the rest condition.

At the completion of the injection of the second charge into the bore, the timer motor advances the cams to cause the cam 129 to close the contacts 129a, energizing the relay 124 causing further rotation of the rotor 27 in the counterclockwise direction to advance the operator 102 past the switch 104 and ultimately into engagement with the switch 106, thereby opening the opening contact 106a and closing the contact 106b. At this point, the relay 124 is deenergized, arresting rotation of the rotor 27 which is now at the rest position. The cam 127 of the timer then opens the contacts 127a to return the motor 72 to its prime direction of rotation. The cam 128 thereupon closes the contacts 128a effecting advance of the piston 48. The cam 128 maintains the contacts 128a closed until the operator 112 has passed beyond the detent 114 in the advancing movement of the piston. When the piston is fully advanced, as sensed by the limit switch operator engaging in the detent 116, its clutch 94 is deenergized and the piston is immobilized in the rest position by the brake 89. Concurrently with or immediately following the advance of the piston which operates to discharge the mixture from the bore 128, the timer cam 130 closes the contacts 130a to energize the valve 61 and to cause hot water to flow outwardly through the nozzle plate in the piston. The timer cam 130 maintains the valve 61 energized for a sufficient time period to eject the proper volume of hot water through the discharge opening 32 to produce the proper mixture of ingredients in the cup 43.

After completion of the injection of the final charge of hot water through the nozzle plate, the timer motor 125 completes a full cycle, and the timer cam 126 opens the contacts 126a, deenergizing the starting relay 121, thereby deenergizing the motor 72 and the timer motor 125, and the circuit is thereupon returned to the rest condition illustrated in full lines in FIG. 17.

The volume of the charges introduced into the mixing chamber at positions B and C may be varied by relocating the detents 114 and 115, and the volume of the charge injected at position A may be varied by modifying the timer cam 130. In this embodiment of the invention, since the charges of diluent are injected through the piston 48, the second charging operation may be effected intermediate the first charging station and the discharging station without arresting the rotation of the rotor, thereby eliminating the need for the limit switch 104. Furthermore additional conventional interlocking controls may be desired to insure completion of each operation before the timer initiates the next operation. Additionally, the rest position can be changed from position B to position A so that the rotor is returned to position A after discharge of the soup and hot water into the container before the cycle of operation of the machine is halted. With this arrangement, the rotor and piston are in a position to receive a charge of condensed soup at the start of a cycle. This will decrease by several seconds the time the user of the machine must wait to receive the container of soup after inserting the coin in the machine.

Figures 18, 19:
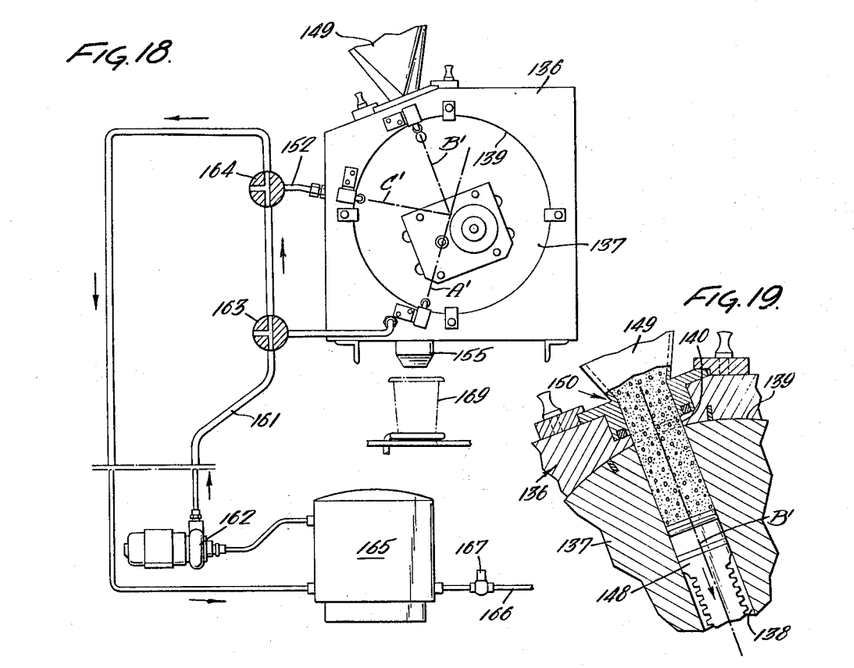
FIG. 18 is a view similar to FIG. 1 showing a modified form of apparatus.
FIGS. 19, 20, and 21 respectively are views similar to FIGS. 12, 13, and 14 respectively, showing the operation of the modified form of unit.

A modified form of apparatus is shown schematically in FIG. 18. In this embodiment of the invention, the second and third charges of the mixture ingredients are injected through passageways in the rotor housing instead of through the piston. In this embodiment of the invention, the mixing and dispensing unit comprises a rotor housing 136 having a cylindrical wall 139 therein slidably receiving a rotor 137 mounted therein for rotation between positions A', B', and C', similar to the positions A, B, and C for the rotor 27. The rotor 137 has a bore 138 therein for receiving the piston 148 adapted to be retracted and advanced in a manner similar to the piston 48 described above.

As in the previously described embodiment, when the rotor is in the illustrated intermediate position B' wherein the bore 138 is in registry with an inlet port 140 in the cylindrical wall 139 connected to an ingredient reservoir 149 at a first charging station 150, the piston 148 is retracted to an intermediate position, drawing a first charge into the bore 138 from the supply at 149. After receiving the first charge, the rotor 137 is rotated to the position C', wherein the bore 138 is in registry with a second charging station 151. The station 151 includes a hot water supply 152 connected to an inlet port 153 having a nozzle plate 154 adapted to register with the bore 138. The nozzle plate 154 operates to inject a second charge, in the present instance hot water, into the bore as the piston 148 is retracted at position C' to thoroughly intermix the injected hot water with the first charge in the bore 138. After the first two charges are intermixed in the bore 138, the rotor 137 is indexed to a discharging station 158 at the rest position A' and the piston 148 is advanced to discharge the mixture from the bore. Concurrently with or immediately following the discharge of the mixture from the bore, a third charge is added to the mixture through the discharge port 155. To this end, the discharge orifice 155 includes an annular nozzle member 156 connected to a supply conduit 157 and operable to thoroughly flush the discharge port. Both the second and third charges are hot water, and to this end, hot water is continuously circulated through a loop 161 including a pump 162, a second valve 163, a first valve 164, and a hot water reservoir 165 adapted to be supplied with makeup water from a suitable supply 166 controlled by a valve 167. Thus, in rest condition, hot water is circulated from the reservoir 165 by the pump 162 through the loop 161. When the rotor 137 positions the bore 138 in registry with the second charging station 151 at C', the valve 164 is energized to inject hot water into the bore. When the proper charge is injected into the bore, the valve is returned to the position shown in FIG. 18 and the rotor 137 is indexed to the discharging station 158 at A'. At this point, the valve 163 is energized to divert the hot water into the discharge orifice 155 for a period sufficient to inject the proper charge to provide the desired consistency in the mixture in the cup 169 positioned below the discharge orifice 155.

Figure 20:
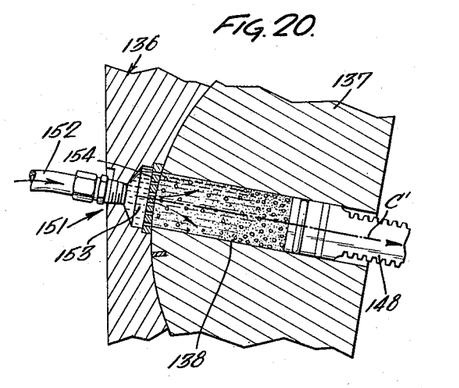
Figure 21:
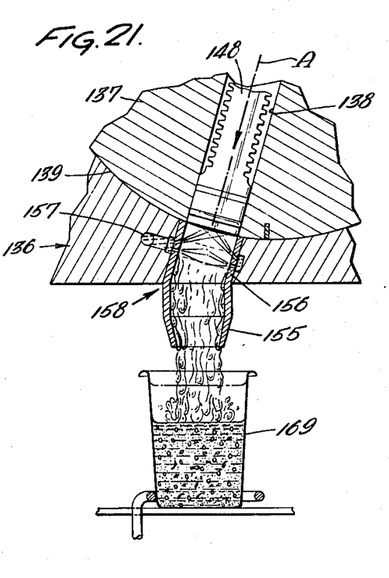

The controls for the unit illustrated in FIGS. 18–20 may be similar to the controls described above. This unit is also readily adaptable to effect a mixture of three separate ingredients. For example, the first charge may be a first ingredient, the second charge may be an additional ingredient supplied from a separate source, and the final charge may be a still further ingredient supplied from a separate source, although it is preferably when dispensing food products to inject hot water at the discharge station to thoroughly flush the unit to prevent contamination. The controls may be modified as discussed to provide the desired ratio of the ingredients.

While particular embodiments of the present invention have been herein illustrated and described, it is not intended to limit the invention to such disclosures, but changes and modifications may be made therein and thereto within the scope of the following claims.

What is claimed is:

1. A method of dispensing a series of measured portions of a liquid mixture having a high solids content, comprising the steps of providing a supply of a component of said mixture including the solids content in highly concentrated fluid form with a viscosity sufficiently high to maintain the solids content in suspension and uniformly dispersed throughout said supply, metering a first charge of said component from said supply into a mixing chamber by connecting said chamber to said supply and expanding said chamber from a closed to a first condition to draw said first charge into said chamber, spraying a measured second charge of a diluting component of said mixture into said chamber under sufficient pressure to thoroughly intermix with said first component in said chamber, discharging said mixture from said chamber, and adding an additional metered charge of a component to said discharged mixture to provide said measured portion with the desired quantity and consistency.

2. A method according to claim 1 wherein said spraying of a measured second charge is effected by spraying said charge into said chamber and expanding said chamber from said first to a second condition.

3. A method according to claim 2 wherein said discharge is effected by connecting said chamber to a discharge port and collapsing said chamber to expel the mixture therefrom, said additional metered charge being added through said discharge port to flush the latter.

4. Apparatus for mixing and dispensing a mixture of ingredients wherein the ingredients are introduced into the mixture in successive charges, comprising an element having a bore therein to receive said charges, a piston in said bore mounted for longitudinal displacement therein to control the volumetric capacity of said bore, means to displace said element between a first charging station and a discharging station, means to introduce a first charge into said bore at said first charging station including means to displace said piston in said bore to accommodate said first charge therein, means to inject a second charge into said bore under sufficient pressure to intermix with said first charge intermediate said first charging station and said discharging station including means to displace said piston to accommodate said second charge within said bore, and means to discharge said mixture from said bore at said discharging station including means to displace said piston to eject the mixture from said bore.

5. Apparatus according to claim 4 wherein said device includes a casing having a wall therein, said element being mounted for displacement in said casing with the open end of said bore slidably engaging said wall, said wall having an inlet port therein at said first charging station adapted to register with said bore during said first charging operation and having a discharge port at said discharging station adapted to register with the open end of said bore at said discharging station.

6. Apparatus according to claim 5 wherein said wall is cylindrical and said element comprises a cylindrical rotor angularly displaceable within said wall, said bore being disposed radially within said rotor and open at the outer periphery of said rotor confronting said cylindrical wall, said wall closing said bore intermediate said stations.

7. Apparatus according to claim 5 including means at said discharge station to inject an additional charge into said mixture upon the discharge of said mixture by said piston, said additional charge being operable to flush said discharge port.

8. Apparatus according to claim 4 wherein said first charge is a highly viscous fluid and said second charge is a fluid of low viscosity, said means to inject the second charge including a spray nozzle operable to inject said charge to effect turbulent intermixing of said first and second charges during the injection of said second charge.

9. Apparatus according to claim 8 wherein retraction of said piston draws said viscous fluid into said bore and including control means operable on said piston to control the retraction thereof to thereby accurately meter the volumetric quantity of said first and second charges respectively.

10. Apparatus according to claim 4 including conduit means providing passages to afford flow of heated fluid through a loop, a fluid outlet in close proximity with the head of said piston at said first charging station, valve means interconnecting said loop and said fluid outlet operable when actuated to divert the flow of fluid in said loop through said outlet to constitute said second charge.

11. Apparatus according to claim 4 including passages in said piston providing a loop for fluid flow, conduit means connected to said passages to afford flow of heated fluid through said loop, a fluid outlet in the head of said piston, and valve means interconnecting said loop and said outlet operable when actuated, to divert the flow of fluid in said loop through said outlet to constitute said second charge.

12. Apparatus according to claim 11 wherein said valve means comprises an element responsive to the direction of flow of fluid through said loop operable in one position to afford flow through said loop and operable in a second position to divert flow from said loop through said opening in the piston head, said valve element being displaceable to said one position by flow through said loop in one direction and displaceable by fluid flow in the opposite direction in said loop to said second position.

13. Apparatus according to claim 12 including flow control means in said conduit means to reverse the flow in said loop to effect injection of said second charge into said bore.

14. Apparatus according to claim 11 wherein said fluid outlet in said piston head comprises spray nozzle means.

15. Apparatus according to claim 4 including common drive means for said element and said piston, and driving connections therebetween including separate clutches and brakes for said element and said piston, said brakes being operable to immobilize its associated element upon disengagement of the clutch.

References Cited

UNITED STATES PATENTS 3,139,343  6/1964  Baselt _______________ 222—86

FOREIGN PATENTS 895,848  4/1962  Great Britain.

ROBERT B. REEVES, *Primary Examiner.*

HADD S. LANE, *Examiner.*